United States Patent
Bauer et al.

[11] 3,888,357
[45] June 10, 1975

[54] SWING BEARING WITH BOLT-ON SEGMENTED GEAR

[75] Inventors: Ralph L. Bauer; Fred E. Simpson, both of Oswego, Ill.

[73] Assignee: Caterpillar Tractor Co., Peoria, Ill.

[22] Filed: Nov. 15, 1972

[21] Appl. No.: 306,707

[52] U.S. Cl. .................. 212/68; 74/448; 212/69; 308/230
[51] Int. Cl. ........................................... B66c 23/84
[58] Field of Search .............. 212/68, 69; 74/448; 308/230

[56] References Cited
UNITED STATES PATENTS
2,313,084   1/1941   Manly ................................ 212/68
3,008,312  11/1961   Jacobus .............................. 74/448
3,439,551   4/1969   Militana ........................... 74/448 X

*Primary Examiner*—Evon C. Blunk
*Assistant Examiner*—Jeffrey V. Nase
*Attorney, Agent, or Firm*—Phillips, Moore, Weissenberger Lempio & Strabala

[57] ABSTRACT

There is disclosed a swing bearing in combination with a swing gear for the slewing platform of hydraulic excavators and the like. The swing gear comprises a plurality of gear segments detachably secured to one race member of the bearing assembly in a manner to form a continuous annular gear element or member. The combination is constructed so that individual segments of the gearing can be removed and replaced without removing the slewing platform.

9 Claims, 6 Drawing Figures

SWING BEARING WITH BOLT-ON SEGMENTED GEAR

BACKGROUND OF THE INVENTION

The present invention is directed to a swing bearing and gear, and pertains particularly to a novel combination of swing bearing and detachable swing gear.

A number of construction and earthworking machines such as excavators and cranes employ a rotatable platform or superstructure mounted on a mobile undercarriage. The rotatable platform, commonly referred to as a slewing platform, normally supports booms, masts and other suitable structures which normally support tools and implements for handling and manipulating construction materials and articles. The slewing platform is normally rotatable 360°, and is supported by means of a large diameter bearing mounted between the rotatable platform and the undercarriage. Rotation of the platform is normally accomplished by a gear drive arrangement including a large diameter ring gear, which is normally integral with one of the members of the bearing assembly.

This combined bearing and gear arrangement provides a generally simple and desirable arrangement. However, because of the unusually large diameters required for the bearings, usually 40 inches or larger, the rings are normally made of a medium carbon steel, and the bearing races and gear teeth are induction or flame hardened. Failure of the gear teeth in such swing gears has been a problem with these constructions. This problem is generally attributable to occasional overloading of the teeth and the relatively poor metalurgical properties obtained by induction or flame hardening of the teeth.

When a tooth failure occurs, the entire superstructure comprising the rotatable platform must be removed from the machine and the entire swing gear and bearing replaced. Such repair requires the use of a well quipped shop having suitable crane or other device for lifting the rotatable platform from the undercarriage. This repair requires considerable man hours of labor, and also results in considerable down time for the machine itself. For these reasons, such repair becomes quite costly.

Other disadvantages of this type of bearing and gear arrangement include the problem of manufacturing such bearing and gear arrangements. The large diameter of these gears requires that special furnace equipment be available for proper heat treating of the gear teeth. It is for this reason that the usual procedure for hardening such teeth is by the use of induction or flame treatment.

The use of induction hardening type of treatment also limits the type of materials that can be used for such gear teeth.

One approach to the problem of gear failure which has been proposed has been to cut out a section of the gear where the teeth have failed and replace it by welding a similar piece in its place. This technique is exemplified in the following patents: U.S. Pat. No. 3,243,874, issued Apr. 5, 1966, and U.S. Pat. No. 3,273,232, issued Sept. 20, 1966.

Other patents which appear to be somewhat pertinent to this problem are the following: U.S. Pat. No. 2,579,749, issued Dec. 25, 1951, and U.S. Pat. No. 3,083,585, issued Apr. 2, 1963. These patents, for example, show that it is known to construct chain sprockets to be assembled from segments. However, a solution to the problem of high strength precision gears as in the present application is not apparent from the prior art.

SUMMARY OF THE INVENTION

It is a primary object of the present invention to provide a swing gear arrangement that overcomes the above problems of the prior art.

Another object of the present invention is to provide the combination of a swing bearing and gear for excavators and the like that is constructed in a manner to permit the use of forging and furnace heat treatment techniques for the gear teeth thereof.

A further object of the present invention is to provide a method of constructing large diameter gears that permits the repair and replacement of portions thereof without removal of the entire gear assembly.

In accordance with the primary aspect of the present invention, the swing gear of a hydraulic excavator and the like is constructed of segments detachably secured to the race of a swing bearing. The detachable segments can be constructed in the usual forging technique and permit the use of the usual furnace treatment to enhance the strength and life of the gear teeth. This arrangement also permits the removal and replacement of gear segments which may become worn or damaged, without the necessity of removing the entire gear and bearing assembly.

BRIEF DESCRIPTION OF THE DRAWINGS

The above and other objects and advantages of the present invention will become apparent from the following description when read in conjunction with the accompanying drawings, wherein.

DESCRIPTION OF PREFERRED EMBODIMENT

Figure 1:
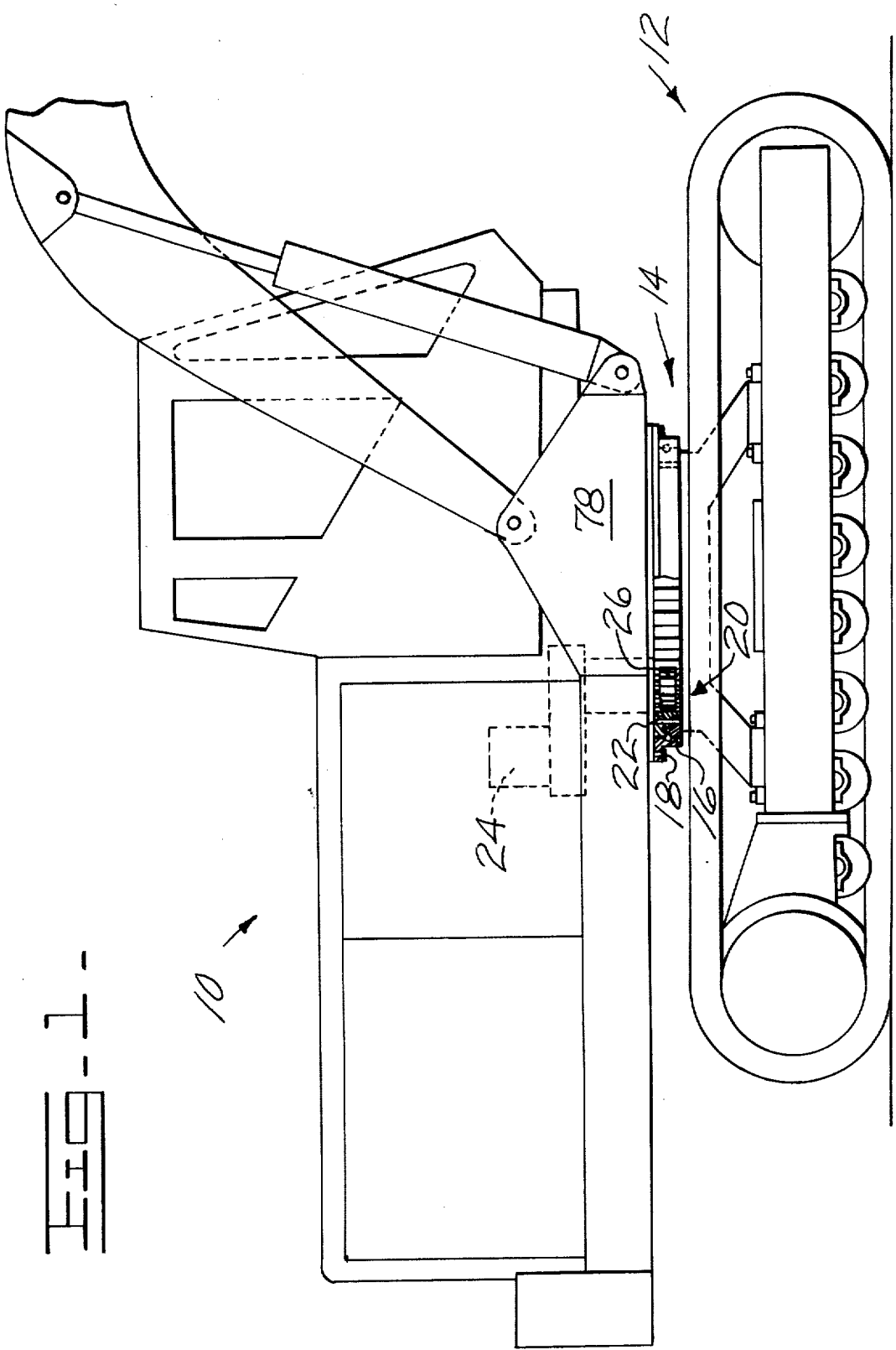
FIG. 1 is a side elevational view of an excavator having portions broken away to illustrate an embodiment of the present invention.

Referring now to the drawings, and particularly to FIG. 1, there is illustrated an excavator having an upper structure 10 rotatably mounted on an undercarriage 12 by means of a swing bearing and gear assembly 14 constructed in accordance with the present invention. The upper structure 10, which may be referred to as a slewing platform, normally supports the usual boom and implement such as a bucket or the like, as well as the operator compartment or cab and the machinery compartment. The undercarriage may be any suitable type to give mobility to the implement, but in the illustrated embodiment comprises standard laterally spaced endless tracks.

The swing gear and bearing assembly as disclosed in the present embodiment comprises an outer annular bearing race member 16 suitably secured such as by means of bolts 18 to the upper structure 10. Annular means 20, defining an inner bearing race member and ring gear means, is suitably secured such as by means of bolts 22 to the mobile undercarriage 12.

A slewing drive motor indicated at 24 is drivingly connected by suitable gear means including a pinion 26 to the stationary ring gear for rotating the slewing platform or upper structure 10 about its vertical axis.

Figure 2:
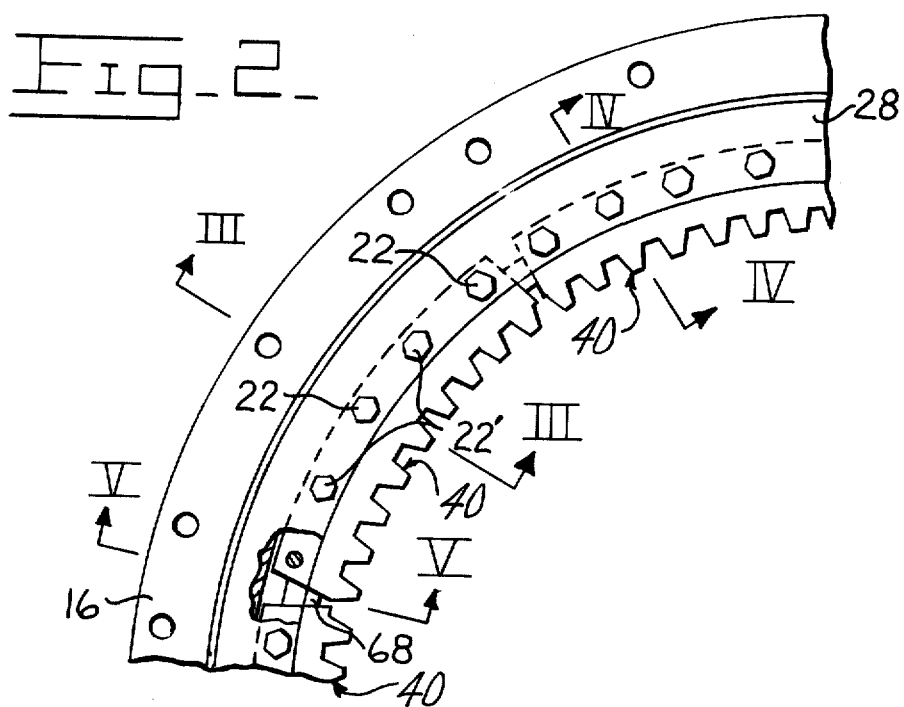
FIG. 2 is a detailed view of a portion of a swing bearing and gear embodying the present invention.
Figure 3:
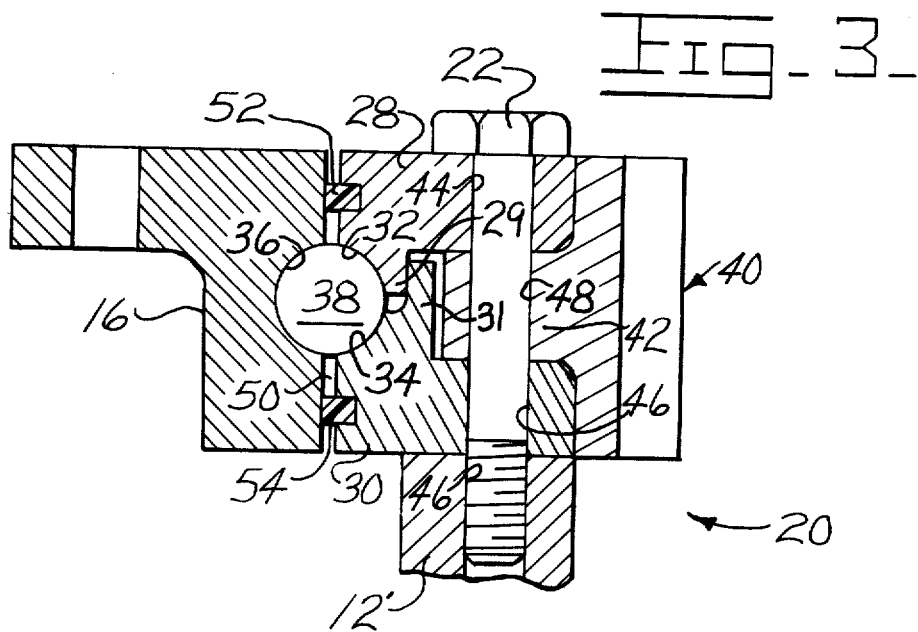
FIG. 3 is a sectional view taken generally along lines III—III of FIG. 2.
Figure 4:
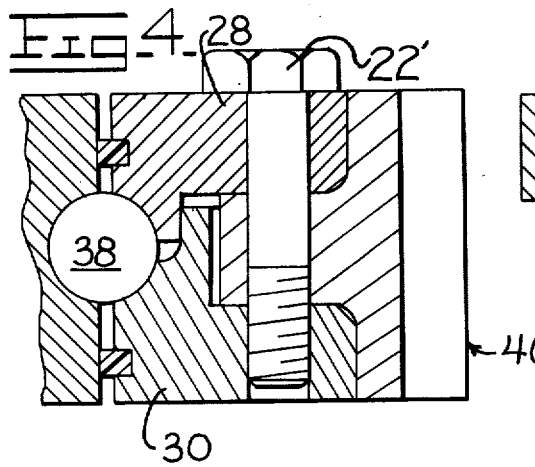
FIG. 4 is a partial sectional view taken generally along lines IV—IV of FIG. 2.

As best seen in FIGS. 2 and 3, the inner bearing race member comprises an upper annular ring member 28 and a lower ring member 30 having a common outer diameter and secured together by bolts 22. Ring members 28 and 30 are each provided with suitable means forming portions 32 and 34 respectively of an inner bearing raceway, and are joined together at a central joint to form the annular inner raceway member. The inner raceway 32, 34 is complementary to an outer raceway 36, formed in the outer member 16, which receives and confines bearing means therein which comprises a series or plurality of circumferentially disposed ball bearing members 38 for transmitting the load from one member 16 for example, to the other member 30, to enable relative rotary movement to occur between these members about a common axis.

A reaction type ring gear is formed by means of a plurality of arcuate gear segments 40 disposed in end to end relation within the inner ring members 28 and 30 to form an endless series of evenly or uniformly spaced gear teeth. Although these gear segments may number as few as two in certain applications, four is the practical minimum in most instances and eight is the preferred minimum in the present embodiment, as will be discussed later.

Each of the gear segments 40 includes a flange 42 extending radially outward from the center of the outer diameter of each segment. The flange extends between ring members 28 and 30 and is secured thereto by the bolts 22 which extend into a portion 12' of the undercarriage 12, and bolts 22' which extend only into the lower ring member 30. The gear segments 40 are made symmetric about the flange 42 in order to insure a more uniform torque distribution and to eliminate stress or distortion resulting from heat treatment during the heat treating process. The bolts 22 and 22' extend through holes 44 and 46 in the upper and lower rings 28 and 30 respectively and through hole 48 in the gear segment 40.

With this arrangement, any particular gear segment 40 may be entirely removed from the swing bearing and gear assembly, completely independent of the remaining gear segments simply by removing the bolts extending through that particular gear segment. Accurate spacing and alignment between the adjacent gear segments is essential in order to insure proper transition from one gear segment to another by the pinion gear. This can normally be accomplished by a careful positioning of the bolt holes, although in some instances it may be necessary to provide pilot holes and pins to insure accurate alignment.

The screws 22' also permit the sub assembly of the swing gear and bearing assembly prior to installation to an excavator or the like. This is accomplished by assembling an outer race 16, rings 28 and 30, and bearing balls 38 and an appropriate number of the gear segments 40. A pair or more of cap screws 22' for each gear segment are then inserted in the holes 42, 46 and 48 for securing the sub assembly together. The ring 28 includes an annular extension 29 which telescopically receives an annular extension 31 of member 30 and serves to accurately position bearing raceways 32 and 34 for proper engagement of the bearing ball 38. These extensions 29 and 31 also serve as a seal for bearing grease which is introduced into chamber 50 between a pair of seals 52 and 54 disposed between the inner and outer raceways.

Figure 5:
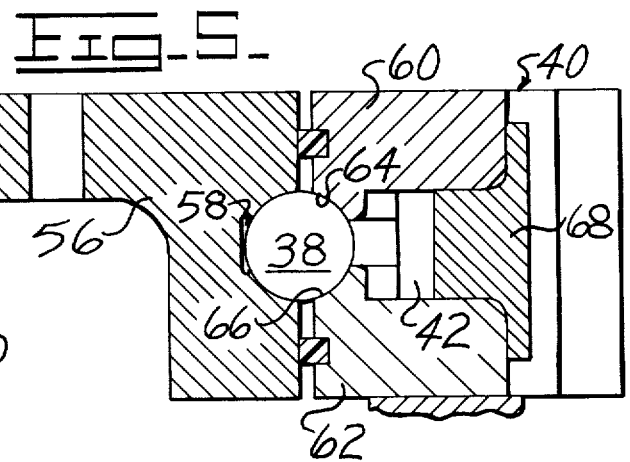
FIG. 5 is a sectional view taken generally along lines V—V of FIG. 2.

With reference now to FIG. 5, there is illustrated an alternate embodiment of the swing bearing and gear assembly wherein an outer ring member 56 is provided with an annular grease cavity 58 in open communication with the bearing ball 38. A pair of identical inner ring members 60 and 62, each having bearing raceways 64 and 66 formed thereon for engagement with the bearing rollers 38, are assembled as in the previous example. Sealing between the inner ring members 60 and 62 is achieved by the flange portion 68 of the gear segments 40 as well as a seal plug 42 of generally triangular T-shaped cross-section which is disposed between adjacent ends of the segments 40, as best seen in FIGS. 2 and 5. These seal plugs are of a size to completely fill the space between the gear segments and prevent bearing grease from moving out into the area of the teeth.

The use of small gear segments 40 permits the segments to be forged from an alloy carburizing steel. Due to the relatively small sizing of the gear segments, they may be carburized in existing furnaces and may then be die quenched in oil to hold necessary tolerances and minimize distortion. This provides a gear with the ultimate in metalurgical properties, and also allows simple and economical replacement in the field if a failed gear should occur.

Figure 6:
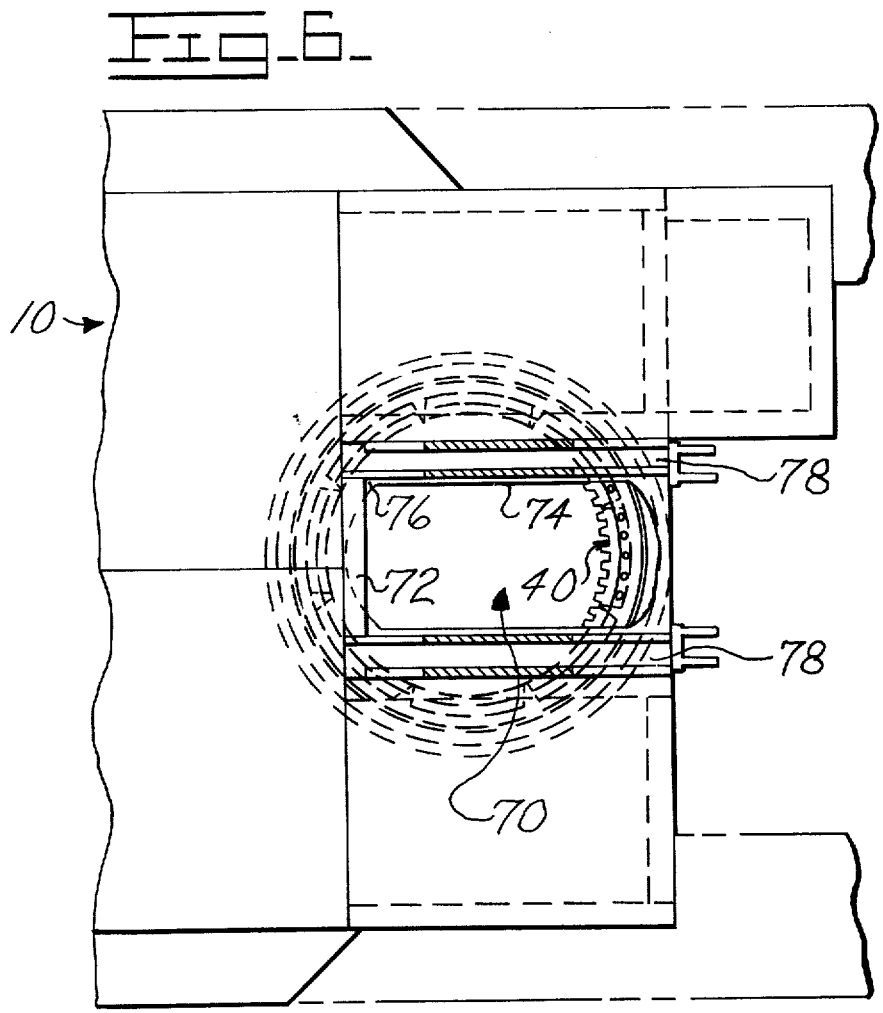
FIG. 6 is a detail plan view taken generally along lines VI—VI of FIG. 1 with portions broken away to illustrate details.

As best seen now in FIG. 6, access to the swing gear is provided from the upper structure or slewing platform 10 by means of a space 70 forward of a top plate 72, and an opening 74 in a lower frame spanner plate 76, which extends between the upper structure frame members 78. The platform structure as illustrated, provides housing means enclosing the swing gear assembly. This space 70 and opening 74 provide access to one complete gear segment 40 for replacement or repair without removal of the entire upper structure. Furthermore, this can be accomplished without replacement of the complete ring gear as a single unit. The upper structure 10 may be rotated to any position around the 360° circle to provide access to any one of the segments of the ring gear. In the illustrated embodiment, the ring gear is comprised of segments, preferably eight in number, to provide an optimum size for the forming and heat treating process as well as to provide for removal through a reasonably sized access hole.

While the present invention has been described with reference to specific embodiments, it is to be understood that numerous changes and modifications may be made in the illustrated embodiments without departing from the spirit and scope of the invention as defined in the appended claims.

What is claimed is:

1. The combination of a swing bearing and swing gear for an excavator, comprising:
    an outer annular bearing race member;
    annular means including a pair of annular members defining inner bearing race means;
    said race members defining a raceway for receiving a plurality of bearing elements to support said members relative to one another;

a plurality of arcuate gear segments detachably secured to said inner race member and defining an endless series of gear teeth forming a ring gear; and, said arcuate gear segments include a flange secured between said annular members.

2. The combination of claim 1 wherein said gear segments are symmetric about said flange.

3. The combination of claim 1 comprising seal means extending between the ends of adjacent gear segments.

4. The combination of claim 3 wherein said seal means is substantially T-shaped in cross-section and extends into a slot of similar cross-section in the end of said gear segments.

5. The combination of claim 3 comprising a grease cavity extending along said bearing raceway.

6. The combination of claim 1 wherein said pair of annular members are joined along said raceway.

7. The combination of claim 1 wherein said annular members include axially extending flange members cooperative to position said members and to seal said bearing raceway.

8. The combination of a swing bearing and swing gear for an excavator, comprising:
    an outer annular bearing race member;
    annular means defining an inner bearing race member;
    said race members defining a raceway for receiving a plurality of bearing elements to support said members for rotation relative to one another;
    a plurality of arcuate gear segments, each having a flange extending radially therefrom and detachably secured to said inner race member and defining an endless series of gear teeth evenly spaced both circumferentially and radially to define an internal ring gear for driving engagement and relative rotation with a pinion gear;
    a mobile carriage;
    a platform rotatably supported on said mobile carriage by said swing bearing and including means for enclosing said ring gear; and
    means permitting replacement or removal of one or more gear segments, said means comprising an opening in said means for enclosing said ring gear having a length greater than a single gear segment but less than two segments for selectively providing access to any one of said gear segments without removal of said platform.

9. A swing gear and bearing assembly further comprising:
    inner and outer annular race members;
    bearing means confined between said members to support one of said members for rotation with respect to the other of said members;
    a plurality of arcuate gear segments, each having a flange extending radially therefrom and detachably secured to one of said members to form an endless series of gear teeth being uniformly spaced both circumferentially and radially to define a continuous ring gear for meshing engagement and relative rotation with a pinion gear;
    a mobile carriage;
    an upper platform;
    said swing bearing operatively supporting said upper platform for rotation on said mobile carriage;
    said upper platform defining housing means enclosing said ring gear; and
    means permitting replacement or removal of one or more gear segments, said means comprising an opening in said housing means above said gear, said opening having a length exceeding the length of one of said gear segments but less than twice the length of said segment in order to selectively provide access to any one of said gear segments.

* * * * *